United States Patent
Schmoutz et al.

(10) Patent No.: US 6,713,100 B1
(45) Date of Patent: Mar. 30, 2004

(54) CONFECTIONERY PRODUCT COMPRISING VEGETABLES SOLIDS

(75) Inventors: Daniel Schmoutz, Perugia (IT); Patrick Clement, Bulle (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/617,930

(22) Filed: Aug. 16, 2000

(30) Foreign Application Priority Data

Aug. 17, 1999 (GB) .............................................. 9919487

(51) Int. Cl.$^7$ ................................................. A23G 3/00
(52) U.S. Cl. ............................ 426/89; 426/99; 426/102; 426/103; 426/660
(58) Field of Search ............................ 426/84, 94, 99, 426/102, 103, 660

(56) References Cited

U.S. PATENT DOCUMENTS

| | | | | |
|---|---|---|---|---|
| 3,431,112 A | * | 3/1969 | Durst ............................ | 426/89 |
| 4,837,042 A | * | 6/1989 | Vajda et al. ................. | 426/102 |
| 4,888,187 A | * | 12/1989 | Given, Jr. et al. ........... | 426/102 |
| 6,027,758 A | * | 2/2000 | McHugh et al. ............. | 426/102 |

FOREIGN PATENT DOCUMENTS

| | | |
|---|---|---|
| DE | 2746479 | 4/1979 |
| DE | 4224356 | 7/1992 |
| GB | 408368 | 11/1933 |
| JP | 57-208950 | 12/1982 |
| WO | WO 83/03524 | 10/1983 |

OTHER PUBLICATIONS

"Fiber in vegetables helps prevent colon cancer", Aug. 7–9, 1998.*

* cited by examiner

Primary Examiner—Lien Tran
(74) Attorney, Agent, or Firm—Winston & Strawn LLP (57) ABSTRACT

A novel, nutritious confectionery product with a taste, texture and color that is particularly appealing to children is disclosed. The food product includes non-cereal vegetable solids and solid fat characterized in that the non-cereal vegetable solids are present in the form of particles in an amount of at least about 15% by weight of the total weight of the confectionery product. These particles are surrounded by the fat. The non-cereal vegetable solids are added and mixed into a continuous phase of fat to provide a shaped fat-based product upon setting.

29 Claims, 2 Drawing Sheets

CONFECTIONERY PRODUCT COMPRISING VEGETABLES SOLIDS

CROSS-REFERENCE TO RELATED APPLICATIONS

Not applicable.

STATEMENT REGARDING FEDERALLY SPONSORED RESEARCH

Not applicable.

REFERENCE TO A MICROFICHE APPENDIX

Not applicable.

1. Field of the Invention

This application relates to a shelf stable confectionery product having a high nutritional value, controlled texture and a confectionery flavor. More particularly, the invention relates to bar-shaped, wafer-based, biscuit-based, molded chocolate or chocolate-like confectionery products incorporating vegetable solids.

2. Background of the Invention

Vegetables provide fiber and nutrients such as vitamins and minerals which are essential for a healthy, balanced diet. Yet, children are often reluctant to consume vegetables, whether cooked or raw, because they consider them to be generally unpalatable. Thus, they tend not to take advantage of the nutrition that vegetables provide. This can give rise to varying degrees of nutritional deficiency among children which in some instances can lead to serious health problems. A number of food products have been described that incorporate vegetables as one of the components, but none combines nutritional value with a taste and texture as well as a melt-in-the-mouth sensation that children in particular would find enticing. EP 0 461 605 A1 relates to a method of manufacturing a health snack food using a low-moisture vegetable, fruit, beans or seaweed as a major ingredient. The snack food also contains saccharide ranging from 5 to 35% by weight. The final product is relatively dry which makes it difficult to chew and swallow, especially for children.

WO 83/03524 relates to a process of preparing marzipan-like products from fruits and vegetables containing at least 70% of a dry substance. The starting material is prepared by reducing vegetables to pulp and mixing with other components such as concentrated lactalbumin preparation and a wetable, gel-forming stabilizing composition. The final product, which is shaped, and coated if desired, by techniques conventionally used in the confectionery industry, is a water and oil emulsion in the form of a gel that has a distinctive texture of marzipan. The final product does not give a sensation of melting in the mouth and it retains the characteristics of the vegetable component.

GB 408.368 relates to a method for preparing sweetmeat consisting of slices of potatoes or other vegetables coated with chocolate. The vegetables are cleaned, sliced thinly, and fried or otherwise cooked. The fried slices are then dipped in melted chocolate and the final coated product is allowed to set. Despite the confectionery glazing, this method products a food product having an interior component that retains the taste and texture of vegetable. Also, frying the shortenings yields a product that can become rancid over a short period in addition to being difficult to digest.

DE-A-2746479 relates to a confectionery containing an adulterant such as shredded dried beet, bran, or vegetable fiber to improve digestion and reduce the sensation of hunger. Small amounts of vegetable fiber having specific digestive properties are incorporated into the confectionery product to promote digestion or to suppress appetite. This food product would not be considered appropriate for normal, healthy children.

DE-0-4224356 relates to a snack food comprising a nutritive material such as meat, sausage, egg or vegetables, in addition to a flavoring, preservative, or a binder such as chocolate or sugar binder. Because the nutritive material is simply mixed with the confectionery binder, the product retains the natural taste and texture of the vegetable or meat component.

Thus, there exists a need to manufacture a food product that not only can function to supplement one's daily dietary needs but which children in particular would simultaneously find highly appealing because of the product's confectionery-like taste and texture, including a melt-in-the-mouth sensation. The present invention provides such type of products and process for preparing them.

SUMMARY OF THE INVENTION

The present invention is directed to nutritious, vegetable-based food products that have a taste and texture that children in particular would find highly agreeable, and to methods for preparing them. In particular, the invention provides a nutritious, vegetable-based food product that has the characteristics of a confectionery product such as chocolate but which can be used as an alternative to fresh vegetables.

The confectionery or food product of the present invention comprises fat and non-cereal vegetable solids in which the non-cereal vegetable solids are present in the form of particles in an amount of at least about 15% by weight of the confectionery product. The non-cereal vegetable solids are mixed with a continuous phase of fat to provide a shaped, fat-based product upon setting. Preferably, the non-cereal vegetable solids are present in an amount of about 30% to about 60% by weight to provide sufficient nutritional value to the confectionery product. The confectionery product can simultaneously satisfy the craving for sweets and serve as a valuable supplement to the daily nutritional needs of an individual particularly those of a child.

The non-cereal vegetable solids in the set product are preferably in the form of finely ground particles similar in size to those of cocoa solids in solid chocolates. The particles in the present invention, including the embedded vegetable solids, are surrounded by a continuous fat phase. The fat preferably remains solid at room temperature but preferably melts within a relatively short period of time when placed in the mouth so as to give a melt-in-the-mouth sensation. Preferably, the fat-surrounded particles are of a size such that they impart to the present product a texture similar to that of a chocolate product. The particle size of the vegetable solids in the product is preferably about 80 microns or less, more preferably about 40 microns or less, and even more preferably about 30 microns or less. The size of the solid vegetable particles should be such that the vegetable solids can be used as a substitute for part or all of the cocoa solids, sugar solids, or milk solids while keeping the texture of the set mass substantially similar to that of pure chocolate. In particular, the particle size should be such that the final confectionery product possesses a smooth and non-gritty texture. The preferred particle size should also facilitate or enhance the flow properties of the product during the molding process.

In a preferred embodiment, the vegetable solids are added to the fat, and the resulting mixture is refined down to the desired particle size using roll refiners. Roll refiners are 3- to 5-cylinder refiners which are generally used for refining chocolate masses. Alternatively, the solid vegetable particles are ground using a grinding mill, before mixing with the fat, to less than about 80 microns, preferably to less than about 40 microns, and more preferably to less than about 30 microns. Ingredients such as sugar, cereal-based components, flavors, and coloring materials can be added to the vegetable-and-fat base composition.

BRIEF DESCRIPTION OF THE DRAWINGS

Various features of the invention are illustrated in the drawing figures that accompany this application wherein.

DETAILED DESCRIPTION OF THE INVENTION

The present invention is directed to confectionery products that combines an appealing taste and texture as well as nutritional value, and the production of such confectionery products. The present invention also encompasses confectionery products that have the characteristics of chocolate but which can be used as an alternative to fresh vegetables. Thus, the confectionery products of the present invention would not only satisfy the craving for sweets but they would also encourage children in particular to increase their intake of vegetables.

One embodiment of the present invention is a confectionery or food product comprising fat and non-cereal vegetable solids in which the non-cereal vegetable solids are present in the form of particles in an amount of at least about 15% by weight of the confectionery product. The non-cereal vegetable solids are mixed with a continuous phase of fat to provide a shaped, fat-based product upon setting. As much as 75% may be present for certain products.

As used herein, the expression "non-cereal vegetable" may be understood as designating all types of vegetables except the group of cereals normally used to make cereals bars such as wheat, oat, soy bean, rice, corn, sorghum, or millet in the form of flour, grains or germs. The "non-cereal vegetable" component also excludes vegetable oil formulations such as soy bean, corn oil, sunflower oil, olive oil, sesame oil, palm oil, seed oil, and other oleaginous products, as well as vegetable shortenings or margarine.

Preferably, the non-cereal vegetable component of the invention is selected from the group consisting of potatoes, beans, lentils, peas, asparagus, aubergine, basil, beet root, broccoli, Brussels sprout, cabbage, carrot, cauliflower, celery, chicory, courgette, cucumber, curly kale, fennel, garlic, gherkins, gourd, leeks, lettuce, narrow, mushrooms, okra, onions, parsnip, peppers, plantain, pumpkin, quorn, radish, spinach, spring greens, swede, sweet corn, tomato, turnip, watercress, yam, zucchini, or any of their combinations. Information about these vegetables can be found in McCance and Widdowson, The Composition Of Foods, 5th ed., p. 223–271 (copyright assigned to The Royal Society of Chemistry, and Ministry of Agriculture, Fisheries and Food), the contents of which are incorporated by reference herewith.

The non-cereal vegetable solids may initially be present in the form of dried vegetable pieces, dried vegetable powder, vegetable distillate, vegetable concentrate, vegetable paste, or any of their combinations. The vegetable paste, vegetable distillate, or vegetable concentrate preferably contains at least about 60% to as high as 100% vegetable solids by weight of the paste, distillate or concentrate. The vegetable paste and concentrate may contain vegetable particles of size initially greater than the final desired fineness. In this case, the particle size of the vegetable solids will still have to be reduced by grinding the initial vegetable component or by refining the vegetable-and-fat mixture in a manner similar to that used in refining a chocolate mass. Reducing the particle size of the vegetable solids either by prior grinding of the vegetable solids or by refining the combined vegetable-and-fat mass allows for flow properties, yield, and plastic viscosities that are optimized for traditional techniques used to mold normal chocolate containing only cocoa solids.

The non-cereal vegetable solids serves mainly to provide nutritional value to the product. The vegetable solids could replace all of the solids in the food product and thus determine the product's dominant texture. The flavor of vegetable may or may not dominate the taste of the confectionery product.

Preferably, the non-cereal vegetable solids are present in an amount of about 30% to as high as about 70% by weight of the product to provide adequate nutritional value to the confectionery product. The non-cereal vegetable solids in the set product are preferably in the form of finely ground particles similar in size to those of cocoa solids in solid chocolates and surrounded by a continuous fat phase.

Preferably, the particle size of the vegetable solids in the set product is about 80 microns or less, more preferably about 40 microns or less, and even more preferably about 30 microns or less. The size of the solid vegetable particles should be such that the vegetable solids can be used as a substitute for part or all of the cocoa solids, sugar solids, or milk solids while keeping the texture of the set fat mass substantially similar to that of pure chocolate. In particular, the particle size should be such that the final confectionary product possesses a smooth and non-gritty texture. The preferred particle size should also facilitate or enhance the flow properties of the product during the molding process.

The phase comprising fat is used mainly to fix the shape of the vegetable component and to adjust the natural texture of the confectionary product. With a given amount of particles refined as described above, the fat phase can be transformed into a confectionery product that has a texture similar to that of chocolate. Sufficient amount of fat is added such that a continuous fat phase envelopes the vegetable particles. Surprisingly, the continuous fat phase imparts a good snap and gloss effect to the final product, in addition to imparting a confectionery texture which is similar or in some cases identical to that of chocolate.

The amount of fat should be sufficient to properly envelope the vegetable particles and allow the mixture to be combined with other components and shaped as desired. If the fat content is too low relative to the vegetable component, the resulting product may not possess the desired texture. The product mixture may also not flow properly during the molding step. If the amount of fat is too high, a waxy texture is often obtained which is undesirable because it confers an unpleasant feel to the mouth. Too much fat also prevents the product from properly melting in the mouth. Also, there would not be enough vegetables in the final product to provide adequate nutrients. The optimum amount of fat can be routinely determined by one of ordinary skill in the art.

To ensure a continuous fat phase for coating the vegetable solids, the fat should be present in at least about 25% by weight of the total product. Preferably, the fat represents between about 30% to about 70% by weight of the total product. The ratio of non-cereal vegetable solids to fat is preferably between about 1:2 to about 3:1. Preferably, the fat comprises added cocoa butter, vegetable fat, or their combination. If cocoa butter equivalents, cocoa butter replacers, or their combinations are used as a source of fat, they should preferably possess crystallization properties necessary for forming stable, shaped confectionery products.

In another embodiments of the present invention, a portion of the confectionery product is aerated to achieve a creamy or foamy texture at a desired overrun level. The resulting vegetable fat mousse can be used as a major ingredient of the confectionery product.

The fat is preferably a solid at room temperature that preferably melts within a relatively short time when placed in the mouth so as to give a melt-in-the-mouth sensation. Preferably, it should form stable fat crystals, which is particularly important during the processing stage. Also, the fat should preferably be selected from fat sources that allow processing of cocoa butter-based products in a manner identical or similar to that used in processing chocolate products. The fat should also preferably crystallize in the same polymorphic form as the cocoa butter or equivalents. Further, the fat is preferably selected from the group consisting of cocoa butter, vegetable fat, or their combination.

Cocoa butter, cocoa butter equivalents, or cocoa butter replacers are highly preferred sources of fat. When combined with vegetable solids, these fat sources enhance acceptance by children, in addition to possessing the requisite crystallization and processing properties. Cocoa butter equivalents are known to crystallize in the same polymorphic form as cocoa butter in the β form. Cocoa butter replacers include lauric types such as those based on coconut and palm kernel oil and non-lauric types such as those based on cottonseed or soya bean oil. They are called non-tempering fats because they solidify from the melt directly into a stable β' form. Although chocolate can be used as a source of cocoa butter fat, it should not be used as the only source. It contains insufficient fat solids to properly mix with the vegetable solids in a continuous phase because the chocolate fat is found in the fat matrix of the cocoa solids. The resulting product may not acquire the desired texture, and the taste of the vegetable solids would be readily apparent upon eating.

Sources of fat that do not have the same crystallization properties as the main fat source may also be added in small amounts. Examples of these fat sources include toffee or cow butter fat. They can be used to adjust or modify the product's texture such as make the product softer. The amount of these complementary fat sources should be small enough to prevent them from interfacing with the crystallization of the main fat.

The fat-based mixture can be colored or flavored to reinforce the natural color or flavor of the vegetable component. The natural flavor of the vegetable component can be masked by using a sufficient amount of one or more flavoring materials, particularly when the confectionery is intended for consumption by children. Appropriate amounts of flavoring agents such as cocoa, vanilla, caramel, peppermint, fruit, yoghurt, or vegetable flavoring agents can be added to the mixture of fat and vegetable solids. Coloring agents may also be added.

In yet another embodiment of the present invention, one or more cereal-based components are added to impart a crispier texture to the confectionery product. The cereal-based component allows adjustment of the specific gravity of the confectionery product because the cereal has a relatively low density compared to that of the non-cereal vegetable and fat-based compound. The cereal-based component can be selected from a group consisting of corn (except sweet corn), oats, wheat, barley, rye, rice, millet, malt or their combinations. They may be added in the form of discrete pieces such as rice crispies, wafer pieces, corn flakes, or their combinations. The amount of added cereal will depend on the desired degree of crispiness and lightness of the confectionery, and it could be from 1% to as much as about 40% by weight of the confectionery product. Excessive amounts of cereal lead to a dry and crumbly product and reduces the beneficial organoleptic benefits by the non-cereal vegetable.

In general, sugar partly determines the final texture and taste of the confectionery product aside from increasing the degree of acceptance by children. It also helps provide the right amount of hardness to the fat phase, and it can serve to partly mask a lingering vegetable flavor of the confectionery product. The added sugar can be selected from the group consisting of glucose, lactose, fructose, sucrose, maltose, dextrose, polydextrose, maltodextrin, inverted sugar, a product of enzymatic saccharification of starch, and their combinations. Different forms of sugar such as crystal or icing sugar can be used. The added sugar would vary depending upon the desired sweetness of the product and could be 1% or more. Sugar is preferably present in an amount of about 6% to about 15% by total weight of the product. Particularly, the maximum amount of sugar is about 55% by total weight of the product.

Invert sugar can also be added to the confectionery composition. This lowers the water activity of the confectionery product which in turn extends the shelf life of the product. Because polyols such as glycerol, sorbitol, mannitol, and xylitol keep the sugar to within reasonably low levels, they can be used either alone or in conjunction with inverted sugar to lower the water activity. Preferably, the confectionery product of the present invention possesses a water activity of about 0.65 or less, more preferably about 0.35. At a water activity of about 0.35, the shelf life is expected to be at least 9 months.

The vegetable-based and fat components of the confectionery product can also comprise whey lactase or milk powder in suitable amounts of modify the structure or texture of the product.

The vegetable-and-fat mixture can be set into a wide variety of forms and configurations. The mixture can be used alone or form part of a more complex confectionery with multi-portions or layers all combined together. The shapes, forms, and configurations of the confectionary product encompassed by the present invention includes bar-shaped multi-layered confectionery, wafer confectionery, biscuit confectionery, and molded chocolate bars, slabs, clusters or rochers containing a refined mixture of fat and non-cereal vegetable as core filling. The fat and vegetable components can be used in various ways, preferably as core components, interleaving layer, or surface layer of the confectionery product. Fruit-based layers can be interposed as intermediate layers between two vegetable-based layers, or vice-versa. To provide sufficient nutritional or organoleptic properties to the confectionery, the vegetable-based and fat portions should preferably have dimensions all in excess of about 3 mm, more preferably about 5 mm.

The present invention also relates to a method of producing a confectionery product comprising at least about 15% by weight of non-cereal vegetable solids in a continuous solid fat phase wherein the fat phase is present in an amount effective to impart a set and stable confectionery shaped structure, said method comprising:

(a) mixing melted fat and at least 15% by weight of non-cereal vegetable solids in the form of particles to form a vegetable-fat mixture;

(b) refining the vegetable-fat mixture to reduce the particle size of the non-cereal vegetable solids to obtain a refined vegetable-fat mixture; and (c) allowing the refined fat vegetable-fat mixture to cool and set in a stable, predefined solid shape.

In a preferred embodiment, the vegetable solids are added to the fat, and the resulting mixture is refined down to the desired particle size using roll refiners. Roll refiners are 3- to 5-cylinder refiners which are generally used for refining chocolate masses. Alternatively, the solid vegetable particles are ground using a grinding mill, before mixing with the fat, to less than about 80 microns, preferably to less than about 40 microns, and more preferably to less than about 30 microns. The ground vegetable particles are combined with the fat, and the resulting mixture in conched. The theory and process of reducing chocolate particle size are discussed in S. T. Beckett, Industrial Chocolate Manufacture And Use, 3rd ed., p. 115–136, the contents of which are incorporated herein by reference.

In another preferred embodiment of the invention, the particle size of the vegetable solids is reduced in the refining stage to about 80 microns or less. Preferably, the fat base is processed after it undergoes refining, complete melting, and cooling to the crystallization point of the fat. This ensures the development of stable crystals in the fat.

EXAMPLES

The following examples further illustrate the present invention but are not to be construed as limiting the invention in any manner. The percentages given are by weight unless otherwise noted.

Example 1

Figure 1:
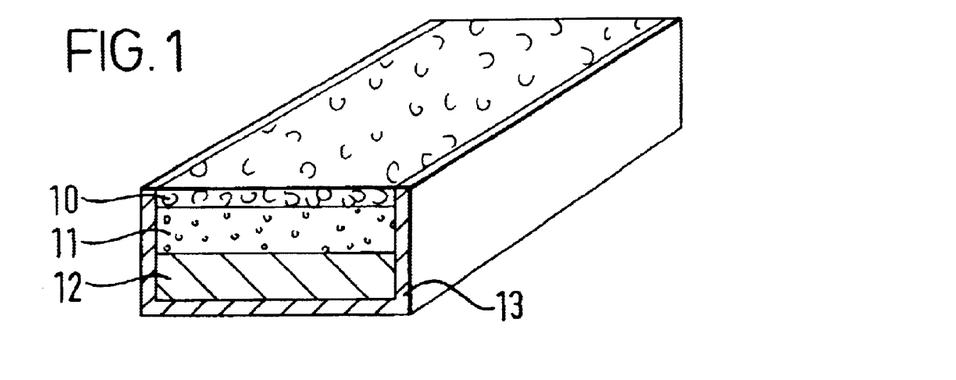
FIG. 1 shows a multi-layered vegetable and cereal bar partly coated with chocolate.

The multi-layered bar-shaped assembly of FIG. 1 comprises a first portion 10 made of a mixture of non-cereal vegetable and fat-based components, the fat-based component preferably being a chocolate fat (e.g., cocoa butter) or an equivalent fat. Optionally, a cereal-based component such as small pieces of cereal grains or flakes can be added to lighten the structure of the first portion. A second portion 11 comprising an aerated mixture of non-cereal vegetable component, milk-based component, and optional sugar is adhered to the first portion. The combination of a crispy vegetable and cereal layer, and a creamy interior vegetable layer surprisingly provides a well-balanced crispness and smoothness to the confectionery. Optionally, a vegetable-based paste comprising at least about 60% vegetable solids and forming a third layer 12 is set adjacent to the second portion. A fat-based coating 13, preferably a chocolate-based layer, partly covers the bottom surface of the third portion and the side surfaces of the multi-layered vegetable assembly to form a homogeneous bar protected from rancidity. Other possible alternatives can be envisioned where the layers 10, 11 and 12 are combined at least two by two in all possible combinations.

Example 2

Figure 2:
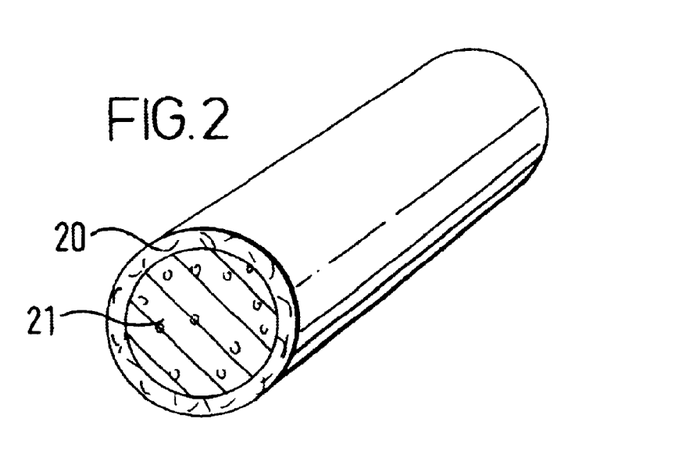
FIG. 2 shows a wafer tube with a vegetable-filled center.

The tubular-shaped assembly of FIG. 2 comprises a relatively thick sugar-based wafer tube 20 with a vegetable-base-filled center 21, having a length of about 80 mm and a thickness of about 20 mm. The cohesion of the vegetable is less important in this case than in the previous example as the wafer tube prevents the vegetable-based portion from breaking up. However, a certain amount of fat in ingredients such as chocolate or vegetable or animal fat is still necessary to produce an acceptable end product. For one, a vegetable-based product that contains fat can be more easily pumped into the wafer's interior. Alternatively, the wafer element may be replaced by any suitable type of biscuit.

Example 3

Figure 3:
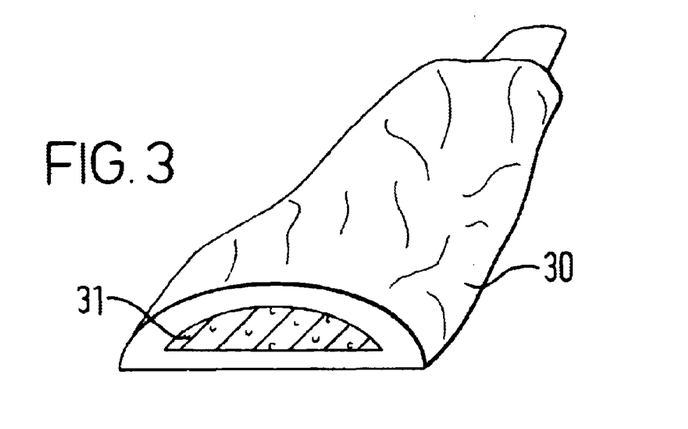
FIG. 3 shows a chocolate molded cluster or bar with a vegetable-and-fat filled center.

FIG. 3 shows another confectionery product variant in which the vegetable-based component forms the center 31 of a fat-based coating having a stiffness and thickness sufficient to retain the shape of the confectionery and avoid spillage or breakage of the vegetable-based component. The outer coating 30 can comprise a dark, white, or milk chocolate molded material. The center can comprise a regular refined mixture of vegetable solids and fat base. Alternatively, the center 31 can comprise an aerated refined mixture of vegetable and fat base.

Mixtures additionally containing fruits, nuts, grains, vegetables or any combinations of these ingredients can also be used as a component of the confectionery product and are intended to be included within the scope of this invention.

Example 4

Figure 4:
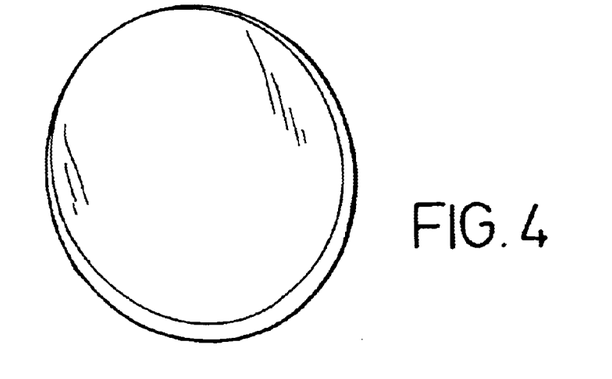
FIG. 4 shows a vegetable and fat confectionery crisp.

FIG. 4 illustrates another possible embodiment of the invention where vegetable-and-fat confectionery crisps are molded from a melted refined mixture of vegetable and fat. The crisps are preferably prepared by roasting pure or reconstituted vegetable flakes and then homogeneously mixing with a suitable amount of fat, preferably cocoa butter or cocoa butter equivalents or replacers. The fat-and-vegetable mixture is refined to attain the desired particle size, preferably below about 40 microns. Surprisingly, when vegetable solids partly or entirely replace the cocoa solids, the molded product acquires a texture very similar to that of chocolate. Small pieces of vegetable could be incorporated to impart a specific texture or a mild vegetable taste. When cocoa butter is used, the resulting confectionery product has a good snap, smooth texture, and taste similar to that of chocolate.

Example 5

Figure 5:
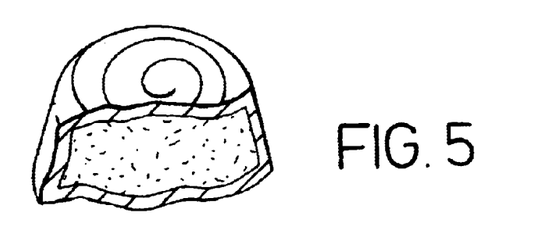
FIG. 5 shows an expanded perspective of a confectionery product comprising vegetable-and-fat shell and filling.
Figure 6:
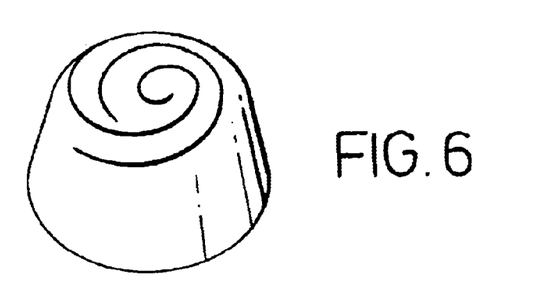
FIG. 6 shows a perspective of the confectionery product of FIG. 5.

FIG. 5 shows a confectionery product comprising a solid vegetable-and-fat shell and an aerated vegetable-and-fat filling. The fat-comprising shell can be tempered to induce a level of crystallization of the fat necessary to impart a good snap and gloss effect to the shell. The shell is produced by a method similar to that used to prepare chocolate shells using a standard shell-forming equipment. The process generally consists of filling a mold, shaking, forming the shell by turning the mold upside down, and oscillating and vibrating the mold to remove excess material. The vegetable-and-fat filling is deposited into a hollow open cavity by a suitable depositing means. Bottoming is carried out using the same material as the shell until final cooling, after which the shells are removed from the mold. Cocoa butter or vegetable fat having chemical and physical characteristics similar to those of cocoa butter can be used as a substitute. These fats are generally, known as cocoa butter equivalents or cocoa butter replacers. Cocoa butter imparts a more pronounced chocolate taste to the confectionery product whereas a coconut butter equivalent, for example, confers a relatively neutral taste. Details about cocoa butter equivalents and cocoa butter replacers are provided in S. T. Beckett, Industrial Chocolate Manufacture And Use, 3rd edition, p. 311–322, the contents of which are incorporated herein by reference.

TABLE 1

| CEREAL AND VEGETABLE WASH (T1) | % BY WEIGHT* |
|---|---|
| Puffed cereals (6 cereals) | 0.72 |
| Corn flakes | 2.39 |
| Freeze dried sweet corn | 2.30 |
| Freeze dried broccoli pieces (10 mm) | 0.86 |
| Strawberry pieces (5–10 mm) | 0.86 |
| Chocolate | 8.63 |
| Cocoa butter | 2.30 |
| Subtotal | 18.07 |

*relative to the total weight of the mixture

TABLE 2

| BASE MIX (T2) | % BY WEIGHT* |
|---|---|
| Icing sugar | 4.05 |
| Skim milk powder | 4.05 |
| Vegetable fat (Whipping fat) | 3.01 |
| Dextrose monohydrate | 1.16 |
| Sub-total | 12.26 |

*relative to the total weight of the mixture

The whipping fat was melted and mixed with the other ingredients using a Hobart mixer. The resulting mixture was then refined using a three-cylinder roller mill. Fine grinding of the vegetable solids in this stage is important because the final texture of the confectionery product depends on this step. The particles are reduced by grinding to sizes below typical limits used for spray dried vegetable powder in which the sizes of the particles are typically greater than 100 microns.

TABLE 3

| AERATED SWEET CORN CREAM (T3) | % BY WEIGHT* |
|---|---|
| Base mix (T2) | 12.26 |
| Vegetable fat | 3.92 |
| Freeze-dried sweet corn | 4.90 |
| Subtotal | 21.08 |

*relative to the total weight of the mixture.

The dried sweet corn was added into the refined base mix. Further grinding was carried out in a three-cylinder roll refiner. The non-melted vegetable fat was then added to the refined mix, and further mixing was carried out using a Hobart mixer.

The mix was aerated up to a density of 0.9 using a Morton pressure mixer at 1.5 bars for about 4 minutes and 30 seconds. Aeration was complete after about 30 seconds at a spaced of about 150 rpm.

TABLE 4

| SWEET CORN FILLING AND COATING | % BY WEIGHT* |
|---|---|
| Sweet corn paste | 36.14 |
| Plain dark milk chocolate | 24.70 |
| Sub-total | 60.84 |

*relative to the total weight of the mixture.

The vegetable and cereal bar was prepared as follows:

A first layer of sweet corn paste was deposited between 4-mm laths followed by a second layer of aerated sweet corn cream (T3 of Table 3) which was deposited between the next 4-mm laths. On top of the cream layer, a layer of vegetable and cereal wash (T1 of Table 1) was deposited between 4-mm laths and was left to set. Plain dark milk chocolate was melted and used to prebase the bar. The finished bar, which were cut into about 80 mm by about 25 mm pieces using a knife, weighed about 33.2 grams. The bar's ingredients and proportions are given in table 5.

TABLE 5

| INGREDIENTS | WT. IN GRAMS | WT. IN %* |
|---|---|---|
| Vegetable and cereal wash | 6.00 | 18.07 |
| Sweet corn aerated cream | 7.00 | 21.08 |
| Sweet corn paste | 12.00 | 36.14 |
| Dark milk chocolate | 8.20 | 24.70 |
| Total | 33.20 | 100.00 |

*relative to the total weight of the mixture.

TABLE 6

| SWEET CORN/CARROT BASE (T6) | % BY WEIGHT* |
|---|---|
| Sweet corn paste | 10.83 |
| Carrot paste | 24.36 |
| Vegetable fat | 24.36 |
| Invert sugar | 6.77 |
| Glycerol | 1.35 |
| Lecithin | 0.41 |
| Subtotal | 54.33 |

*relative to the total weight of the mixture.

Invert sugar was mixed with glycerol in a Hobart mixer after which sweet corn, carrot paste, lecithin, and vegetable fat were successively added. The entire mixture was mixed using the Hobart mixer and refined using a three-roll refiner.

TABLE 7

| VEGETABLE FILLING | % BY WEIGHT* |
|---|---|
| Sweet corn base (T6) | 54.33 |
| Green and white leek flakes | 4.06 |
| Mixed pepper granules | 4.06 |
| Whole Sweet corn | 3.38 |
| Carrot ¼ diced | 3.38 |
| Tomato/Basil grains | 4.06 |
| Subtotal | 73.50 |

*relative to the total weight of the mixture.

The carrot pieces were dipped into the invert sugar from mix T6 of Table 6. The vegetable and the sweet corn base were then added while stirring. The vegetable filling so obtained was used to fill a thick sugar wafer tube using a piping bag. The final filled wafer tube weighed about 20 grams. Table 8 gives the ingredients and proportions of the wafer tube which is about 20 mm thick and about 80 mm long.

TABLE 8

| INGREDIENTS | WT. IN GRAMS | % BY WEIGHT* |
|---|---|---|
| Sugar wafer tube | 5.30 | 26.50 |
| Vegetable filling | 14.70 | 73.50 |
| Total | 20.0 | 100.00 |

*relative to the total weight of the mixture.

Example 6

A crisp-shaped roasted sweet potato fat product is prepared from a base mix comprising the ingredients give in Table 9 below.

TABLE 9

| BASE MIX (T9) | WT. IN GRAMS | WT. IN %[2] |
|---|---|---|
| Roasted sweet potato flakes | 300 | 56.24 |
| Vegetable fat[1] | 150 | 28.12 |
| Sugar | 25 | 4.69 |
| Salt | 5 | 0.94 |
| Sub-Total | 480 | 89.99 |

[1]Illexao 30/69 (Equivalent cocoa butter)
[2]relative to the total weight of the mixture The sweet potato flakes are roasted in an unventilated oven at 200° C. The other ingredients are added after cooling down the roasted flakes. The combination is mixed in a Hobart mixer and then refined using a three-roll refiner. The potato fat base is further processed with a base mix prepared from the ingredients listed in Table 10 below.

TABLE 10

| POTATO CHOCOLATE | WT. IN GRAMS | % BY WEIGHT* |
|---|---|---|
| Base mix of Table 9 (T9) | 480 | 89.99 |
| Vegetable fat | 50 | 9.37 |
| Lecithin | 3.40 | 0.64 |
| Total | 533 | 100.00 |

[1]Illexao 30/69 (cocoa butter equivalent)
*relative to the total weight of the mixture The cocoa butter is mixed until it completely melts in a Hobart mixer. The refined base mix (T9) is then added into and mixed with the melted cocoa butter. After mixing using a Hobart mixer for about an hour, lecithin is added. This is followed by mixing for another 10 minutes or so.

The potato fat base, which has characteristics similar to those of cocoa butter, is tempered like a regular chocolate. Tempering ensures the development of stable crystals in the fat. It also imparts a good snap and gloss effect in the final product similar to those in a chocolate crisp. Tempering is performed by first lowering the temperature down to a seeding temperature of about 26–27° C. and then increasing the temperature slightly to 29–30° C. The seeding temperature may be slightly lowered by adding lecithin.

The tempered base is deposited on a perforated rubber belt with a plurality of oval apertures resting flat on a table. Before allowing the mixture to harden, the flat crisps are placed on curved molds to set the final crisp shape.

The potato crisps obtained each weight about 4 grams. The crisps have a salted potato taste with a texture very similar to that of a chocolate product that has a good snap and gloss.

Example 7

The same type of product is prepared as in Example 3 except that the vegetable fat is replaced by cocoa butter in about the same proportion as the vegetable fat. Also, less salt is used. The final product has about the same good snap and gloss, but its taste more closely resembles that of chocolate, which makes the potato taste to some extent.

Example 8

A straight line of sweet potato chocolates are manufactured using a buttered potato filling in molded potato compound shells. The base mixture is prepared from the ingredients of Table 14 below.

TABLE 11

| BASE MIX | WT. IN GRAMS | % BY WEIGHT* |
|---|---|---|
| Roasted sweet potato flakes | 300 | 28.12 |
| Cocoa butter | 150 | 14.06 |
| Sugar | 25 | 2.34 |
| Salt | 5 | 0.47 |
| Subtotal | 480 | 44.99 |

*relative to the total weight of the mixture.

The base mix is prepared as in Example 3. The shell is prepared using the ingredients of Table 12 below.

TABLE 12

| POTATO CHOCOLATE | WT. IN GRAMS | % BY WEIGHT* |
|---|---|---|
| Base mix | 480 | 44.99 |
| Cocoa butter | 50 | 4.69 |
| Lecithin | 3.4 | 0.32 |
| Subtotal | 533 | 50.00 |

*relative to the total weight of the mixture.

Potato chocolate is similarly prepared as in Example 4 or 5 except that the filling uses a base mix comprising the ingredients listed in Table 13 below.

TABLE 13

| FILLING BASE MIX | WT. IN GRAMS | % BY WEIGHT* |
|---|---|---|
| Icing sugar | 1750 | 11.31 |
| Skim milk powder | 1750 | 11.31 |
| Vegetable whipping fat | 1300 | 8.4 |
| Dextrose mono-hydrate | 500 | 3.23 |
| Sub-total | 5300 | 34.25 |

*relative to the total weight of the mixture.

The filling base mixture is prepared by melting the whipping fat and adding the other ingredients to the melted fat. This is followed by mixing using a Hobart mixer and refining using a three-roll refiner. The filling base mix is then used to prepare the buttered potato filling having the ingredients reported in Table 14 below.

TABLE 14

| BUTTERED POTATO FILLING | WT. IN GRAMS | % BY WEIGHT* |
|---|---|---|
| Base mix | 120 | 34.25 |
| Icing sugar | 20 | 5.71 |
| Vegetable whipping fat | 19.98 | 9.99 |
| Buttered potato flavour | 0.17 | 0.05 |
| Subtotal | 175.17 | 50.00 |

*relative to the total weight of the mixture.

Solid vegetable fat and the other ingredients are added into the refined base mixture all of which are mixed for about 30 seconds at about 150 rpm using a Hobart mixer. The resulting mixture is then aerated up to a density of about 0.9 using a Morton pressure mixer for approximately 4 minutes and 30 seconds at a pressure of about 1.5 bar.

The potato compound is then tempered like a regular chocolate and molded to form the shells. The shells are allowed to set after which buttered potato filling is deposited into them using a piping bag. The filled shells are sealed with potato chocolate base to form the shell bottoms. The confectionery is allowed to cool down and then removed from the mold. The weight and proportions of the confectionery are shown in Table 15 below.

TABLE 15

| INGREDIENTS | WT. IN GRAMS | % BY WEIGHT* |
|---|---|---|
| Potato shell | 3.4 | 34.00 |
| Buttered filling | 5.00 | 50.00 |
| Potato back-off | 1.6 | 16.00 |
| Total | 10.00 | 100.00 |

*relative to the total weight of the mixture.

The final confectionery product has a diameter of about 2.7 mm, a height of about 2.2 mm, and a weight of about 10 grams. Their appearance and taste are quite similar to those of chocolate.

Deposit of Computer Program Listings

Not applicable.

What is claimed is:

1. A nutritious confectionery product comprising:
   at least 25% by weight of solid fat selecting from the group consisting of cocoa butter, derivative of cocoa butter, vegetable fat, and a combination thereof;
   at least 15% by weight of non-cereal vegetable solids finely ground to a size of about 80 microns or less that are dispersed in a continuous fat phase of the solid fat which serves as a matrix for the vegetable solids that sets to form a stable shape for the product and to impart a confectionery texture to the product; and
   from about 6 weight percent to 15 weight percent sugar to control hardness of the solid fat and reduce water activity to about 0.65 or less,
   wherein the ratio of non-cereal vegetable solids to fat is between about 1:2 to about 3:1.

2. The confectionery product according to claim 1, wherein the fat is present in an amount of at least about 30% by weight of the product.

3. The confectionery product according to claim 1, wherein the non-cereal vegetable solids comprise finely ground particles having a size of about 40 microns or less.

4. The confectionery product according to claim 1 wherein the non-cereal vegetable solids are present in an amount ranging from about 30 to about 60% by weight of the confectionery product.

5. The confectionery product according to claim 4, wherein the non-cereal vegetable solids comprises at least one type of vegetable preparation selected from the group consisting of dried vegetable pieces, dried vegetable powder, vegetable paste or vegetable distillate, vegetable concentrate and mixtures thereof.

6. A nutritious confectionery product comprising:
   at least 25% by weight of solid fat selected from the group consisting of cocoa butter, derivative of cocoa butter, vegetable fat, and a combination thereof; and
   at least 15% by weight of non-cereal vegetable solids finely ground to a size of about 80 microns or less that are dispersed in a continuous fat phase of the solid fat which serves as a matrix for the vegetable solids that sets to form a stable shape for the product and to impart a confectionery texture to the product, wherein the non-cereal vegetable solids comprises a vegetable selected from the group consisting of potatoes, beans, lentils, peas, asparagus, aubergine, basil, broccoli, Brussel sprout, cabbage, carrots, cauliflower, celery, chicory, cucumber, curly kale, fennel, garlic, gourd, leeks, lettuce, marrow, mushrooms, okra, onions, parsnip, peppers, plaintain, pumpkin, corn, radish, spinach, spring greens, tomato, turnip, watercress, yam, zucchini, and mixtures thereof; and
   from about 6 weight percent to 15 weight percent sugar to control hardness of the solid fat and reduce water activity to about 0.65 or less and wherein the fat imparts a melt-in-the-mouth sensation upon being placed in the mouth.

7. A nutritious confectionery product comprising:
   at least 25% by weight of solid fat selected from the group consisting of cocoa butter, derivative of cocoa butter, vegetable fat, and a combination thereof;
   at least 15% by weight of non-cereal vegetable solids finely ground to a size of about 80 microns or less that are dispersed in a continuous fat phase of the solid fat which serves as a matrix for the vegetable solids that sets to form a stable shape for the product and to impart a confectionery texture to the product; and
   from about 6 weight percent to 15 weight percent sugar to control hardness of the solid fat and reduce water activity to about 0.65 or less,
   wherein the product is formed from a chocolate or equivalent thereof where the vegetable solids have replaced at least a portion of the cocoa solids, sugar solids, or milk solids, or a combination thereof in the chocolate.

8. The confectionery product according to claim 6, wherein the ratio of non-cereal vegetable solids to fat is between about 1:2 to about 3:1.

9. The confectionery product according to claim 1, wherein the fat consists of cocoa butter, cocoa butter equivalent, cocoa butter replacer, crystallizable vegetable fat, and mixtures thereof.

10. The confectionery product according to claim 1, further comprising at least one cereal-based component in an amount of up to about 40% by weight of the confectionery product.

11. The confectionery product according to claim 10, wherein the cereal-based component is selected from the group consisting of corn, oats, wheat, barley, rye, rice, millet malt and mixtures thereof.

12. The confectionery product according to claim 1, wherein the vegetable solids comprise a combination of vegetables.

13. The confectionery product according to claim 12, wherein the sugar is selected from the group consisting of glucose, lactose, fructose, sucrose, maltose, dextrose, polydextrose, maltodextrin, inverted sugar, a product of the enzymatic saccharification of starch and mixtures thereof.

14. The confectionery product according to claim 1, which is at least partly covered by a fat-based layer.

15. The confectionery product according to claim 1, wherein the product is present as a center filling of a fat-based chocolate shell.

16. The confectionery product according to claim 1, wherein the product comprises a center filling and a shell, each of which comprises non-cereal vegetable solids and fat.

17. The confectionery product according to claim 1, further comprising a first further shaped component of an aerated mixture of a non-cereal vegetable component, a milk-based component and an optional sugar component, wherein the further shaped component is positioned adjacent the shaped mixture in a first set configuration.

18. The confectionery product according to claim 17, wherein the first set configuration is at least partly covered by a chocolate layer.

19. The confectionery product according to claim 17, further comprising a second further shaped component comprising a non-cereal vegetable paste, wherein the second further shaped component is positioned adjacent the shaped mixture in a second set configuration.

20. The confectionery product according to claim 19, wherein the second set configuration is at least partly covered by a chocolate layer.

21. The confectionery product according to claim 1, wherein the shape of the product is in the form of a bar, slab, rock, cluster or crisp.

22. The confectionery product according to claim 1, wherein the stable shape is placed upon a wafer or biscuit.

23. The confectionery product according to claim 22, wherein wafer or biscuit has the shape of a tube, boat or plane.

24. A nutritious confectionery product comprising:
of at least 25% by weight of solid fat, selected from the group consisting of cocoa butter, derivative of cocoa butter, vegetable fat, and a combination thereof; and
about 30% to about 60% by weight of non-cereal vegetable solids comprising finely ground particles having a size of about 80 microns or less, wherein the vegetable solids are dispersed in a continuous fat phase of the solid fat which serves as a matrix wherein the ratio of non-cereal vegetable solids to fat being from about 1:2 to about 3:1;
at least one cereal-based component in an amount of up to about 40% by weight; and
sugar in an amount from about 6 weight percent to 15 weight percent sugar to control hardness of the solid fat and reduce water activity to about 0.65 or less, wherein the product sets to have a stable shape and a confectionery texture with the fat imparting snap, gloss, and a melt-in-the-mouth sensation when the product is placed in the mouth.

25. The confectionery product according to claim 24, wherein the non-cereal vegetable solids comprises at least one type of vegetable preparation selected from the group consisting of dried vegetable pieces, dried vegetable powder, vegetable paste or vegetable distillate, vegetable concentrate and mixtures thereof; the fat comprises cocoa butter, cocoa butter equivalent, cocoa butter replacer, crystallizable vegetable fat, and mixtures thereof, the cereal-based component is selected from the group consisting of corn, oats, wheat, rye, rice, millet malt and mixtures thereof; and the sugar is selected from the group consisting of glucose, lactose, fructose, sucrose, maltose, dextrose, polydextrose, maltodextrin, inverted sugar, a product of the enzymatic saccharification of starch and mixtures thereof.

26. A nutritious confectionery product comprising:
at least 25% by weight of solid fat selected from the group consisting of cocoa butter, derivative of cocoa butter, vegetable fat, and a combination thereof to impart snap, gloss, and a melt-in-the-mouth sensation upon being placed in a consumer's mouth; and
at least 15% by weight of non-cereal vegetable solids finely ground to a size of about 80 microns or less that are dispersed in a continuous fat phase of the solid fat which serves as a matrix for the vegetable solids that sets to form a stable shape for the product and to impart a confectionery texture to the product wherein the ratio of non-cereal vegetable solids to fat is from about 1:2 to about 3:1; and
from about 6 weight percent to 15 weight percent sugar to control hardness of the solid fat and reduce water activity to about 0.65 or less.

27. The confectionery product of claim 24, wherein the product is formed from a chocolate or equivalent thereof where the vegetable solids have replaced at least a portion of the cocoa solids, sugar solids, or milk solids, or a combination thereof in the chocolate.

28. The confectionery product of claim 26, wherein the product is formed from a chocolate or equivalent thereof where the vegetable solids have replaced at least a portion of the cocoa solids, sugar solids, or milk solids, or a combination thereof in the chocolate.

29. The confectionery product of claim 1, which further comprises a flavoring material in an amount sufficient to mask the natural vegetable flavor.

* * * * *

UNITED STATES PATENT AND TRADEMARK OFFICE
CERTIFICATE OF CORRECTION

PATENT NO.    : 6,713,100 B1
DATED         : March 30, 2004
INVENTOR(S)   : Schmoutz et al.

It is certified that error appears in the above-identified patent and that said Letters Patent is hereby corrected as shown below:

Column 13,
Line 45, change "solid fat selecting from the" to -- solid fat selected from the --.

Column 16,
Line 15, change "corn, oats, wheat, rye," to -- corn, oats, wheat, barley, rye, --.

Signed and Sealed this

Thirteenth Day of September, 2005

JON W. DUDAS
*Director of the United States Patent and Trademark Office*